United States Patent [19]

Schaaf et al.

[11] 4,399,875
[45] Aug. 23, 1983

[54] AUTOMATIC SUPPORT FOR FOLDING WING FRAME IMPLEMENT

[75] Inventors: Wayne J. Schaaf; Bennie J. Boswell, both of Kewanee, Ill.

[73] Assignee: Chromalloy American Corporation, St. Louis, Mo.

[21] Appl. No.: 372,159

[22] Filed: Apr. 26, 1982

[51] Int. Cl.³ .............................................. A01B 73/00
[52] U.S. Cl. .................................. 172/311; 172/466; 172/662
[58] Field of Search ............... 172/311, 456, 776, 466, 172/662

[56] References Cited

U.S. PATENT DOCUMENTS

| | | | |
|---|---|---|---|
| 3,866,689 | 2/1975 | Anderson | 172/456 |
| 4,023,623 | 5/1977 | Anderson | 172/311 |
| 4,159,038 | 6/1979 | Eichenberger | 172/311 |
| 4,249,616 | 2/1981 | Moe | 172/311 |
| 4,314,610 | 2/1982 | Riewerts et al. | 172/776 |

Primary Examiner—Richard T. Stouffer
Assistant Examiner—William H. Honaker
Attorney, Agent, or Firm—Haverstock, Garrett & Roberts

[57] ABSTRACT

An automatic support for folding frames such as those used in many agricultural implements. The folding frames include at least one generally horizontally disposed main frame section having at least one wing frame section hingedly connected thereto, the wing frame being movable between a lowered, outwardly extended working position wherein it is substantially coplanar with the main frame, to an upwardly folded transport position wherein it generally overlies the main frame and forms an included angle of less than 90°. The automatic support includes a support arm, connecting link and pivot link all of which are pivotally interconnected with the wing frame section to form a four bar linkage arrangement. When the wing frame is in its extended working position the support arm is in close proximity to the wing frame providing the implement with a low overall profile. The four bar linkage arrangement is configured so that predetermined pivotal movement of the pivot link which also effects raising of the wing frame to its upwardly folded position, causes the support arm to move to a position which is generally vertical but outwardly inclined from the wing frame so as to permit abutment means on the support arm to engage the main frame. Thus, a substantial portion of the weight of the wing frame is distributed to the main frame through the support arm.

16 Claims, 5 Drawing Figures

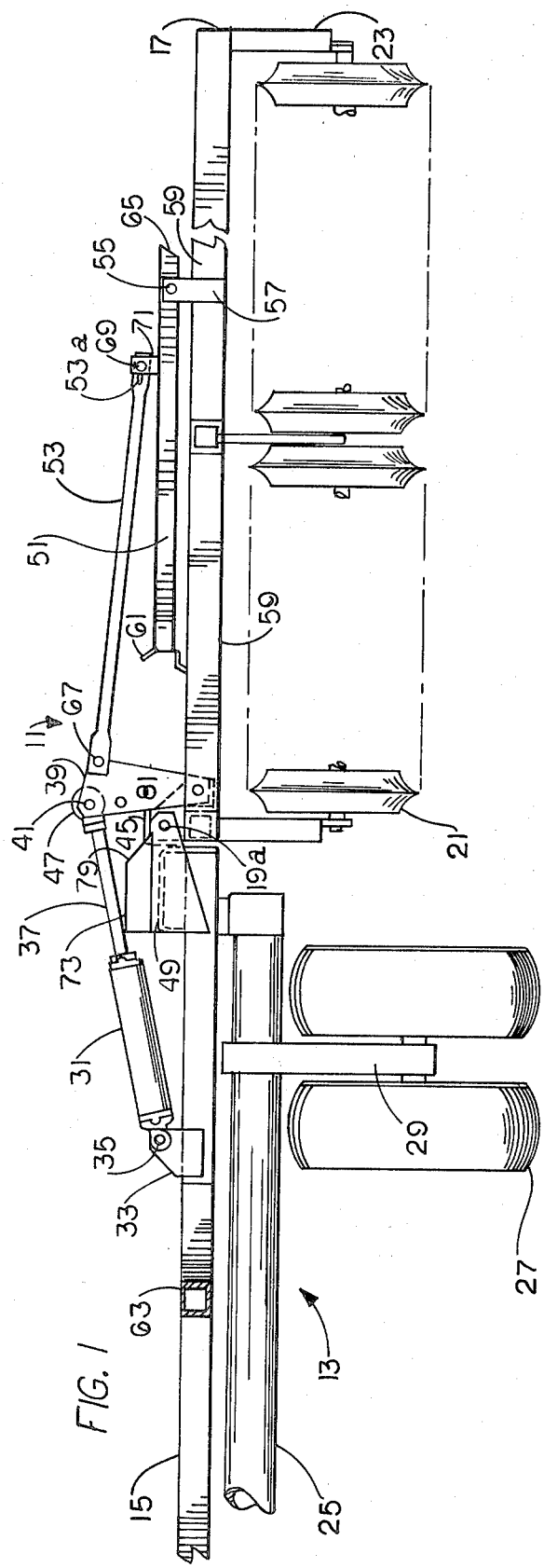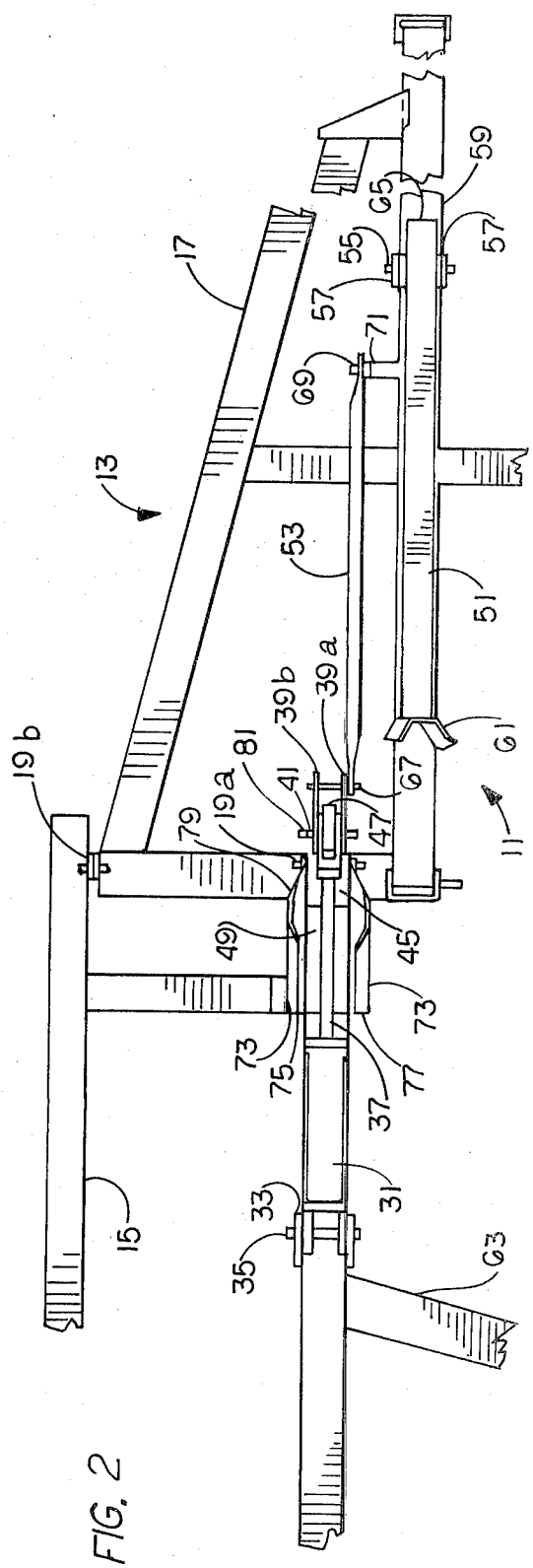

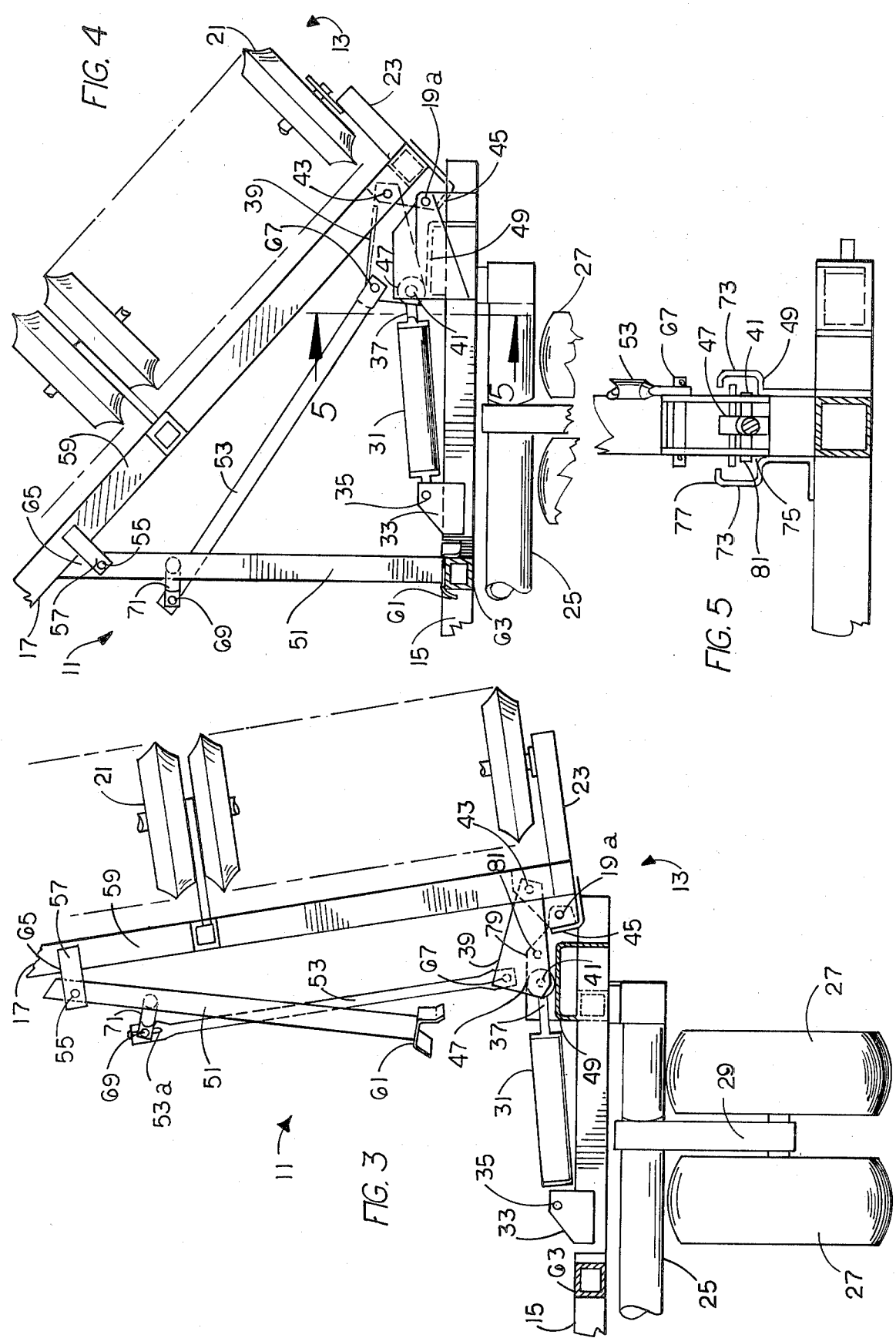

AUTOMATIC SUPPORT FOR FOLDING WING FRAME IMPLEMENT

BACKGROUND OF THE INVENTION

The present invention relates generally to foldable frames such as those used in many types of agricultural implements, and more particularly to an automatic support for the folding sections of such frames.

DESCRIPTION OF THE PRIOR ART

Many agricultural implements, such as row crop cultivators, mulchers and the like, employ earth working tools which are mounted in gangs on horizontally disposed frames to permit the implements to work a wide swath of earth. Because of their size, the implements are difficult to transport along roads and highways designed for conventional vehicles. For this reason, the implement frames have been designed to include a main frame having one or more wing frame sections hingedly connected to laterally opposite sides of the main frame so that the wing frame sections can be folded from lowered, outwardly extended working positions wherein they are substantially coplanar with the main frame, to upwardly folded transport positions wherein they generally overlie the main frame.

To facilitate support of the wing sections when in their upwardly folded transport positions, numerous types of supports have been developed. One type of known support takes the form of a bar-shaped member which is rigidly secured at one end to one of the frame sections. The opposite end of the bar-shaped member is adapted to engage a complementary surface on the adjacent frame section in supporting relation therewith when the wing section is in the upwardly folded position. See, for example, U.S. Pat. No. 3,866,688. The rigidly secured bar-shaped type support members have the disadvantage that they extend considerably above the implement frame sections when in their unfolded positions, which presents an unattractive profile. A further disadvantage is that the upwardly projecting support members can readily become entangled in low hanging branches or the like during use of the implement.

Folding wing frame supports that attempt to maintain the support arms in close proximity to one of the implement frame sections when the wing frame section is in its lowered working position have been developed. One such folding support is shown in U.S. Pat. No. 4,249,616. The support arms and connecting linkage, however, still project considerably above the implement frame sections.

BRIEF DESCRIPTION OF THE INVENTION

The present invention finds particular application with a foldable agricultural implement which includes a generally horizontally disposed main frame section having at least one wing frame section pivotally or hingedly connected thereto. The wing frame section is movable between an outwardly extended working position, wherein it is substantially coplanar with the main frame section, and an upwardly folded transport position, wherein it overlies the main frame, generally forming an included angle of less than 90° therewith. In accordance with the present invention, an automatic support mechanism is operatively associated with the wing frame section and the main frame so as to be automatically actuated to support the wing frame section when moved to its upwardly folded transport position.

The automatic support mechanism includes a support arm, a pivot link and a connecting link which are pivotally interconnected with the associated wing frame section to form a four bar linkage arrangement. The support arm is pivotally connected adjacent one of its ends to the wing frame section and has an abutment means which is adapted for engagement with the main frame when the wing frame section is in its upwardly folded position.

The support mechanism is configured so that when the wing frame section is in its lowered working position, the pivot and connecting links project only slightly above the implement frame sections, and the support arm lies in close proximity to the wing frame section thus providing a low overall profile. Upward pivotal movement of the wing frame section may be achieved by employment of conventional drive means, such as a fluid pressure operated actuating cylinder, acting on the pivot link. The support arm remains in close proximity to the wing frame section until the wing section passes over center at which time the pivot link engages a guide track. By virtue of the four bar linkage arrangement, the action of the guide track on the pivot link effects automatic movement of the support arm to a position which is generally vertical but outwardly inclined from the folded wing frame section. This causes the abutment means to engage the main frame section so that the weight of the wing frame section is substantially supported on the main frame section through the support arm, and the load on the wing actuating cylinder is reduced to substantially zero.

Accordingly, it is a general object of the present invention to provide a novel automatic support for use with a foldable frame section in an agricultural implement or the like.

A more particular object of the present invention is to provide a novel automatic support for a foldable wing frame section in a foldable frame implement that has a relatively low profile when the wing frame section is in its lowered working position but which is automatically moved to a support position when the wing frame section is raised to its upwardly folded transport position.

A feature of the automatic support of the present invention lies in the provision of a support arm, a pivot link, and connecting link cooperatively associated with the wing frame section to define a four-bar linkage arrangement. The pivot link facilitates raising and lowering of the wing section through an actuating cylinder and is caused to undergo predetermined movement during raising of the wing section so as to automatically move the support arm into supporting relation with the main frame section as the wing section reaches its upwardly folded position.

These and other objects, advantages and features of the invention will become apparent from the following detailed description and accompanying drawings of which:

FIG. 1 is a fragmentary rear elevational view of an agricultural implement having a main frame section and a foldable wing frame section and employing an automatic support constructed in accordance with the present invention, the wing frame section being shown in its lowered working position;

FIG. 2 is a fragmentary plan view, on a slightly enlarged scale, of the implement and automatic support shown in FIG. 1;

FIG. 3 is a fragmentary rear elevational view of the implement of FIG. 1 but showing the wing frame section intermediate its lowered working position and its upwardly folded transport position, and having portions broken away for clarity;

FIG. 4 is a view similar to FIG. 3 but showing the wing frame section in its upwardly folded position supported by the automatic support; and FIG. 5 is a fragmentary sectional view of FIG. 4 taken generally along line 5—5 and looking in the direction of the arrows.

DETAILED DESCRIPTION OF THE INVENTION

Referring to the drawings and in particular to FIGS. 1 through 4, one embodiment of an automatic support mechanism, constructed in accordance with the present invention, is indicated generally at 11 and is illustrated, by way of example, in operative association with an agricultural implement, indicated generally at 13.

In the illustrated embodiment, the agricultrual implement takes the form of a mulcher having a main frame section 15 and a pair of foldable wing frame sections, one of which is indicated at 17. Because the mulcher 13 is generally symmetrical about its longitudinal axis, only one side of the main frame 15 and a single wing frame section 17 and associated automatic support 11 are shown in the Figures. The main frame 15 is adapted for connection to a draft vehicle such as a tractor or the like.

Both the main frame 15 and wing frame sections 17 have a generally flat skeletal configuration and are preferably fabricated from structural tubular steel. Each wing frame section 17 is pivotally or hingedly connected to a lateral side of the main frame section 15 so as to be foldable about pivotal or hinge connections 19a and 19b from an extended lowered working position, wherein each wing frame lies substantially coplanar with the main frame section 15 as shown in FIGS. 1 and 2, to an upwardly folded transport position, wherein the wing frame overlies the main frame forming an included angle of less than 90°, as shown in FIG. 4. Gangs of ground working tools in the form of mulching wheels 21 are mounted beneath the wing 17 and main 15 frame sections in a conventional manner, although only mulching wheels 21 mounted through mounting arms 23 on wing frame 17 are illustrated. It will be appreciated that the implement 13 may have only one foldable wing frame section mounted on the main frame, if desired.

A transverse rockshaft 25 is pivotally mounted on the main frame 15 and has pairs of transport wheels, one pair of which is shown at 27, secured thereto by a support strut 29 so that rotation of the rockshaft 25, by conventional means such as a crank or hydraulic cylinder (not shown), effects raising and lowering of the wheels 27 to move the frame sections 15 and 17 and associated mulching wheels 21 between raised transport positions wherein the mulching wheels 21 are spaced above ground level for transport, and lowered positions wherein the mulching wheels are in ground working positions.

Raising and lowering of the wing frame 17 between its lowered operating and upwardly folded transport positions is effected by reciprocating drive means or actuating means in the form of a double acting fluid pressure operated actuating cylinder 31. The actuating cylinder 31 may, for example, comprise an hydraulic cylinder adapted for connection in an hydraulic control circuit which enables selective actuation by an operator on an associated draft vehicle to which the implement is connected during operation. The cylinder 31 is pivotally connected to the main frame 15 through a support bracket 33 and pivot pin 35, and has an extendible piston 37 the outer end of which is pivotally connected to the wing frame section through a pivot link 39 and pivot pin 41. The pivot link 39 preferably comprises a pair of parallel spaced pivot plates 39a, 39b, which are pivotally connected to the wing frame at 43. When the wing frame 17 is in its lowered or extended working position, retraction of the piston 37 causes the pivot link 39 to bear against first stop means in the form of a bracket 45 which is fixed on the wing frame adjacent hinge connection 19a and limits movement of the pivot link 39 relative to the wing frame so as to establish a relatively fixed relation between them. Further retraction of the piston 37 causes the wing frame 17 to pivot upwardly about its hinge axis 19a, b.

Pivotal connections 43 and 41 between the pivot link 39 and the wing frame 17 and piston 37 respectively, are arranged so that as the wing frame passes over center during upward folding (i.e., as the center of gravity of the wing frame passes upwardly through a substantially vertical plane containing the hinge axis 19a, b), a roller 47 rotatably mounted on hinge pin 41 engages second stop means in the form of a guide track 49. The guide track 49, which may alternatively be termed control means, is disposed substantially parallel to the plane of the main frame 15 and receives and supports the roller 47 throughout folding movement of the wing frame after it passes over center until it reaches its fully folded position overlying the main frame. As illustrated in FIGS. 3 and 4, when the roller 47 engages the guide track 49, the pivot link 39 disengages from the first stop 45 and the pivotal connection 41 thereafter undergoes rectilinear movement under the control of the actuating cylinder 31 and guide track 49 to effect controlled movement of wing section to its folded position, generally as disclosed in U.S. Pat. No. 4,023,623.

In accordance with the invention, as the wing frame 17 moves over center during folding to its transport position, the automatic support mechanism 11 is automatically actuated and supports the wing frame when fully folded over the main frame, thereby reducing the load of the wing frame acting on the actuating cylinder 31. Stated alternatively, the support mechanism 11 supports the wing frame 17 when in its folded position so that the piston end of actuating cylinder need not be continually pressurized.

As shown in FIG. 1, the automatic support 11 includes a support arm 51, a connecting link 53 and the aforementioned pivot link 39, all of which are pivotally interconnected with the wing frame section 17 and form therewith a four-bar linkage arrangement. The four-bar linkage arrangement is configured to effect movement of the support arm 51 between first and second positions as the wing frame section is moved between its lowered working and its upwardly folded positions. In the first position, the support arm 51 lies in close proximity to the lowered wing frame section 17 as shown in FIGS. 1 and 2. In its second position, the support arm 51 is generally vertical but outwardly inclined from the plane of wing frame section 17 so as to engage the main frame section 15 and support the wing frame section 17 in its upwardly folded transport position, as shown in FIG. 4.

The support arm 51 may comprise an elongated tubular strut having a generally rectangular transverse cross section. It is pivotally connected, generally adjacent one end, to the wing frame section 17 as shown at 55. Pivotal connection 55 is made through spaced hinge plates 57 fixed to opposite sides of a frame member 59 on wing frame section 17 so that the support arm overlies frame member 59. As shown in FIG. 2, the longitudinal axis of frame member 59 is offset from a vertical plane containing the longitudinal axis of actuating cylinder 31, and is thereby also offset from the pivot plates 39a, b. The hinge plates 57 provide pivotal clearance for the support arm 51 as it is moved from its first to its second position. The support arm 51 also includes abutment means in the form of a U-shaped bracket 61 fixed on the end of the support arm opposite its pivotal connection 55 to wing frame 17 for engagement with a rib or frame member 63 on the main frame 15 when the wing frame is in its folded position. The support arm 51 preferably has an inclined surface 65 formed on its end opposite bracket 61, surface 65 being configured to contact frame member 59 when the wing frame 17 approaches its upwardly folded position.

The connecting link 53 may also comprise an elongated strut and has one end pivotally connected through a pivot pin 67 to the pivot link 39. The opposite end of link 53 is pivotally connected in slot 53a to support arm 51 intermediate the U-shaped bracket 61 and pivot connection 55 through a pivot pin 69 which is mounted on a spacer bar 71 rigidly connected to the support arm 51. As shown in FIG. 2, the connecting link 53 and the associated pivotal connection 69 are laterally offset from the axis of support arm 51 so that the connecting link 53 does not interfere with support arm 51 during relative movement therebetween. Pivotal connection 69 is also spaced from or eccentric to the logitudinal axis of support arm 51, as considered in elevation in FIG. 1, so as to establish a moment arm between the axis of support arm 51 and any force vector acting logitudinal of the connecting link 53. The moment arm is of a length such that a force vector acting logitudinally of the connecting link 53 to pivot axis 69 exerts a rotational moment on the support arm 51 about the pivot axis 55 urging the support arm outwardly from the plane of the wing frame when the pivot link 39 releases from stop 45 and roller 47 engages guide track 49 during upward folding of the wing frame. Because of the slot 53a, surface 65 is intended to be a stop to limit the outward movement of support arm 51, while the inner end of the slot 53a acts as a stop to limit the inward movement of support arm 51 when the wing frame approaches the folded position, thus, holding support arm 51 in a generally vertical position so that the U-shaped bracket 61 on the end of support arm 51 will engage frame member 63 on main frame 15.

As illustrated in FIG. 1, the support arm 51 and connecting link 53 lie in close proximity to the plane of the wing frame 17 when in its lowered operating position so as to form a relatively low profile therewith. As the wing frame 17 is initially raised toward its upwardly folded position, the pivot link 39 abuts stop 45 on the wing frame so as to remain in fixed relation therewith, maintaining the support arm 51 in close proximity to the wing frame 17.

As aforementioned, when the wing frame 17 is raised to a position wherein it forms approximately a 90° included angle with the main frame 15, the roller 47 engages the guide track 49 so that continued retraction of piston 37 causes the wing frame to continue its upward rotation about hinge axis 19a, b while the pivot link 39 is caused to pivot in a counterclockwise direction about pivot axis 43 relative to the wing frame, as considered in FIGS. 1, 3 and 4. In this manner, the pivot link 39 cooperates with the guide track 49 so as to effect predetermined movement of the pivot link during movement of the wing frame section between its lowered and upwardly folded positions. The four-bar linkage arrangement is configured so that such pivotal movement of the pivot link 39 about its pivot axis 43, relative to the wing frame 17, causes the support arm 51 to automatically pivot outwardly from the plane of wing frame about the pivot axis 55 so as to assume a generally vertical position as the wing frame 17 approaches its fully folded position as shown in FIG. 4. In this position, continued upward movement of the wing frame causes the U-shaped bracket 61 to engage frame member 63 on the main frame 15. The weight of the wing frame 17 is thus substantially carried by the main frame through the support arm 51. By supporting the wing frame through the support arm 51, the weight of the wing frame is not applied to the actuating cylinder 31 and the fluid pressure to the piston end of the cylinder may be reduced to substantially zero if desired.

When it is desired to lower the wing frame 17 to its extended working position, the operator applies appropriate fluid pressure to the piston end of the cylinder 31 to extend piston 37 and initiate movement of the wing section 17 toward its upright position. To insure that the roller 47 does not accidentally rise substantially above the guide track 49 during this movement of the wing frame 17, laterally spaced side walls 73 are secured to opposite ends of the guide track 49, as best shown in FIGS. 2 and 5, and are formed to define opposing channels 75 between which the roller 47 is received when in engagement with the guide track. The side walls 73 have overhanging lips 77 and are inclined at their forward edges 79 so that as the roller 47 contacts the guide track 49 during upward folding, outwardly extending end portions of a locking pin 81 mounted transversely through suitable openings in the pivot plates 39a, b are received within the opposed channels 75. In this manner the overhanging lips 77 prevent upward movement of the pivot link 39 relative to the guide track 49 as the wing frame is moved from its fully folded to its upright position.

In lowering the wing frame to its extended working position, movement of the pivot link 39 is confined by the side walls 73 so that the relative movement between pivot link 39 and the wing frame 17 is effected in a direction which causes the connecting link 53 to automatically pull the support arm 51 inwardly toward the wing frame member 59. As the wing frame passes over center, the pivot link 39 again engages stop 45 so that controlling the exhaust of fluid pressure from the rod end of cylinder 31 controls lowering of the wing frame to its fully extended position. During this time, the support arm 51 is maintained in close proximity to wing frame member 59 by the relatively rigid pivot link 39 and connecting link 53.

While a preferred embodiment of the present invention has been illustrated and described, it will be understood that various modifications may be made therein without departing from the invention in its broader aspects.

Various features of the invention are set forth in the following claims.

What is claimed is:

1. In an implement or the like having a main frame section and at least one wing frame section pivotally connected to said main frame section for movement between a lowered outwardly extended position and an upwardly folded position wherein said wing frame section forms an included angle of less than 90° with said main frame section, an automatic support apparatus operatively associated with said main and wing frame sections and operative to support said wing section when in said upwardly folded position, said automatic support apparatus comprising:

a support arm pivotally connected generally adjacent one end to said wing frame section and adapted to lie in relatively close proximity to said wing frame section so as to provide a low profile when said wing frame section is in said extended position, said support arm having abutment means thereon spaced from said one end and adapted for engagement with said main frame section when said wing frame section is in said upwardly folded position;

a pivot link pivotally connected to said wing frame section at a position spaced from the pivotal connection of said support arm to said wing frame section;

a connecting link pivotally connected to said pivot link at a point spaced from the pivotal connection of said pivot link to said wing frame section, said connecting link also being pivotally connected to said support arm such that said pivot link, connecting link, support arm and wing frame section form a four-bar linkage arrangement;

first stop means operatively associated with said wing frame so as to limit pivotal movement of said pivot link relative to said wing frame section during initial movement of said wing frame section toward its upwardly folded position, so that said support arm is maintained in close proximity to said wing frame section;

and second stop means operatively associated with said main frame and cooperative with said pivot link so as to effect predetermined pivotal movement of said pivot link relative to said wing frame section during final movement of said wing frame section to its upwardly folded position;

said four-bar linkage arrangement being configured to effect movement of said support arm to a position inclined outwardly from said wing frame section with said abutment means engaging said main frame section so that said support arm substantially supports said wing frame section when said wing section is in its upwardly folded position.

2. Apparatus in accordance with claim 1 wherein said support arm includes a stop means adapted for contacting said wing frame section when it approaches its upwardly folded position.

3. Apparatus in accordance with claim 1 wherein said abutment means on said support arm comprises a generally U-shaped bracket.

4. Apparatus in accordance with claim 1 further comprising said first stop means being affixed to said wing frame section and said second stop means being affixed to said main frame section so that said wing frame section can be raised and lowered between said extended and upwardly folded positions by predetermined reciprocating movement of said pivot link while simultaneously effecting operation of said automatic support apparatus.

5. Apparatus in accordance with claim 4 further comprising reciprocating drive means associated with said pivot link.

6. Apparatus as defined in claim 5 wherein said second stop means includes a guide track, said pivot link had roller means mounted thereon for cooperation with said guide track so as to effect said predetermined movement of said pivot link during movement of said wing frame to its said upwardly folded position.

7. Apparatus as defined in claim 6 wherein said guide track defines a rectilinear guide surface, said reciprocating drive means including an actuating cylinder having pivotal connection to said main frame section and said pivot link, and said roller means being coaxial with said pivotal connection between said cylinder and said pivot link.

8. Apparatus in accordance with claim 5 further comprising a pair of side walls associated with said guide track, said walls having overhanging lips defining a pair of opposing channels and a locking pin transversely mounted on said pivot link, the end portions of said locking pin being adapted to be received in said opposing channels to prevent upward movement of said pivot link relative to said guide track as said wing frame is moved between its extended and upwardly folded positions.

9. Apparatus in accordance with claim 5 wherein said reciprocating drive means comprises an hydraulic cylinder pivotally connected to said main frame section and having the piston thereof pivotally connected to said pivot link.

10. In an implement having a main frame section and at least one wing frame section pivotally connected to said main frame section for movement between a lowered outwardly extended position and an upwardly folded position wherein said wing frame section forms an included angle of less than 90° with said main frame section, an automatic support apparatus operatively associated with said main and wing frame sections and operative to support said wing section when in said upwardly folded position, said automatic support apparatus comprising:

a support arm pivotally connected generally adjacent one end to said wing frame section and adapted to lie in relatively close proximity to said wing frame section so as to provide a low profile when said wing frame section is in said extended position, a pivot link pivotally connected to said wing frame section at a position spaced from the pivotal connection of said support arm to said wing frame section, a connecting link pivotally connected to said pivot link and said support arm such that said pivot link, connecting link, support arm and wing frame section form a four-bar linkage arrangement, actuating means operatively associated with said main and wing frame sections and operative to effect movement of said wing frame section between its said lowered and folded positions, and control means cooperative with said pivot link so as to effect predetermined movement thereof during movement of said wing frame section between its said lowered and folded positions, said four-bar linkage arrangement being configured to effect automatic movement of said support arm into supporting relation with said main frame section as said wing frame reaches its folded position.

11. An implement as defined in claim 10 wherein said connecting link is pivotally connected to said support arm eccentric to the longitudinal axis of said support arm so that a force acting longitudinally of said connecting link in the direction of said eccentric pivotal connection urges said support arm pivotally outwardly from the plane of said wing frame section.

12. An implement as defined in claim 11 wherein said pivot link is pivotally connected to said wing frame section generally adjacent the pivotal connection between said main frame section and said wing frame section, said connecting link being pivotally connected at one end to said pivot link at a point spaced from the pivotal connection of said pivot link to said wing frame section, and wherein said means for effecting said predetermined movement of said pivot link comprises stop means cooperative with said pivot link so as to effect selective pivotal movement thereof about its pivotal connection to said wing frame section in a manner to effect movement of said support arm toward its said supporting relation with said main frame during movement of said wing frame section toward its folded position.

13. An implement as defined in claim 12 wherein said stop means includes a guide track supported by said main frame section so as to effect said selective movement of said pivot link as said wing frame section is moved through an over-center position toward its said upwardly folded position.

14. An implement as defined in claim 13 including additional stop means operatively associated with said wing frame section and said pivot link and operative to maintain said pivot link in fixed relation to said wing frame during initial movement of said wing frame from its lowered position toward its said folded position, said four-bar linkage arrangement being operative to maintain said support arm in relatively close proximity to said wing frame section while said pivot link is maintained in said fixed relation to said wing frame section.

15. An implement as defined in claim 14 wherein said actuating means includes an actuating cylinder pivotally connected to said main frame section and said pivot link, said pivot link being released from said additional stop means so as to enable pivotal movement thereof relative to said wing frame section as said wing frame section passes over center toward its said folded position, said pivot link being cooperative with said control means so as to effect movement of said support arm to its said supporting relation with said main frame section as said wing frame section passes from said over-center position toward its said folded position.

16. An implement as defined in claim 10 wherein said support arm includes abutment means adapted for engagement with said main frame section when said wing frame section is in its said folded position.

* * * * *